May 24, 1960   O. W. HEIMBERGER ET AL   2,937,782
HEAD CLOSURE CONSTRUCTION FOR HEAT EXCHANGER
Filed Jan. 4, 1957

INVENTORS
Oscar W. Heimberger
BY  Frank Boni Jr.

Frease & Bishop
ATTORNEYS

United States Patent Office 2,937,782
Patented May 24, 1960

2,937,782

HEAD CLOSURE CONSTRUCTION FOR HEAT EXCHANGER

Oscar W. Heimberger and Frank Boni, Jr., Massillon, Ohio, assignors to The Griscom-Russell Company, Massillon, Ohio, a corporation of Delaware Filed Jan. 4, 1957, Ser. No. 632,532

5 Claims. (Cl. 220—46)

This invention relates to head closure construction for heat exchangers and more particularly it pertains to wedge shear blocks for securing a head cover or tube sheet in place.

Heat exchangers ordinarily include interfitting parts involving close manufacturing tolerances. The primary reason for this is that most heat exchangers are subjected to relatively high hydrostatic loads and require close fitting parts to prevent leaking of the fluid during operation at the higher pressure.

The fabrication of parts having close manufacturing tolerances involves a great amount of time and labor in order to create and maintain a sealed joint between the fluid partition parts subjected to hydrostatic pressures. For example, the cover for a head member of a heat exchanger is detachably mounted which requires that fluid-tight joints must be provided between the cover and the barrel wall of the heat exchanger.

In the past these parts have necessarily been provided with very close tolerances to reduce as much as possible the clearance therebetween and thereby provide better sealed joints than where larger clearances are permitted. For example, the so-called "L-head" type of heat exchanger head cover includes lugs or projections extending radially inwardly of the head barrel for engaging similar lugs or projections extending outwardly of the cover plate for the head barrel, which lugs or projections require accurate tolerances for satisfactory engagement between the surfaces thereof.

The device of the present invention provides shear blocks having inclined edges for wedging between the cover and barrel wall of a heat exchanger for the dual purpose of initially engaging and retaining the members together. In addition, the device may be used to subsequently adjust the members into even closer fitting engagement after the heat exchanger is in operation. For example, when a tube sheet or cover for the head of a heat exchanger is installed, a fluid-tight joint must be provided to prevent intermixing or leakage of the heat exchange fluids. The use of wider manufacturing tolerances without the sacrifice of integrity of the fluid-tight joint saves time and cost in the production of the heat exchanger.

The shear blocks take up clearances for engaging as well as sustaining the parts in fluid-tight engagement during the initial local deformation under pressure due to the hydrostatic load within the heat exchanger.

Generally, it is an object of this invention to provide a heat exchanger in which the interfitting surfaces between the barrel wall and the head cover, or tube sheet where detachable, are provided with greater clearances than was possible heretofore.

It is another object of this invention to provide greater clearances between the barrel wall and the head cover, or tube sheet where detachable, without sacrificing the integrity of the fluid-tight joint therebetween.

It is another object of this invention to provide means for taking up clearances due to wider manufacturing tolerances in order to provide fluid-tight joints between the barrel wall and the head cover, or tube sheet where detachable.

It is another object of this invention to provide blocking means for taking up clearances and subsequently adjusting for initial local deformation of parts under hydrostatic pressure.

It is another object of this invention to provide shear blocks for retaining the hydrostatic load within the head member of a heat exchanger.

Finally, it is an object of this invention to provide an improved head closure construction for a heat exchanger which incorporates the foregoing desiderata in an inexpensive manner and with simplified maintenance and operation.

These and other objects and advantages apparent to those skilled in the art from the foregoing description and claims may be obtained, the stated results achieved, and the described difficulties and problems overcome and solved by the parts, elements constructions, mechanisms, combinations, subcombinations and arrangements which comprise the present invention, the nature of which is set forth in the following general statement, preferred embodiments of which—illustrative of the best modes in which applicants have contemplated applying the principles—are set forth in the following description and shown in the drawing, and which are particularly and distinctly pointed out and set forth in the appended claims forming part hereof.

The nature of the discoveries and improvements of the present invention may be stated in general terms as including in a heat exchanger a closure member having a periphery seated within the inner surface of the barrel wall, a shoulder on the inner surface of the barrel wall against which the inner face of the closure member is seated, blocking means including wedge blocks enagaing the outer face of the closure member opposite the shoulder, the blocking means engaging a recess in the inner surface of the barrel wall, the wedge blocks having top and bottom sides inclined at an acute angle with respect to one another and with the bottom sides engaging the outer face of the closure member, the wedge blocks having a smaller thickness between top and bottom sides at their outer edges than at their inner edges, the smaller thickness portions of the wedge blocks establishing blocking means wedge engagement between the recess and the closure member, and means engaging the wedge blocks for seating the blocking means in wedge engaging position.

By way of example, the improved heat exchanger head closure construction is shown in the accompanying drawings, in which.

Similar numerals refer to similar parts throughout the several views of the drawing.

Figure 1:
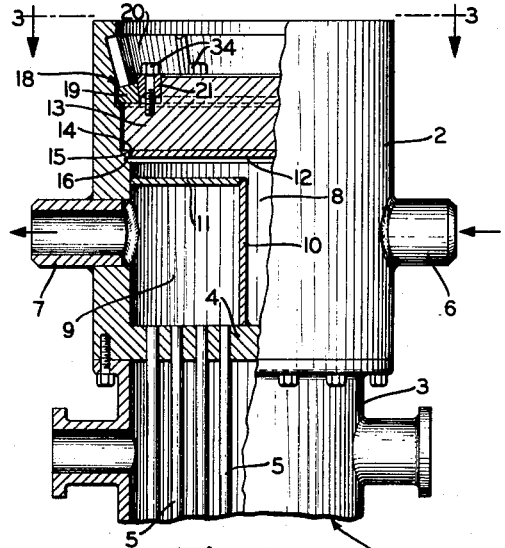
Fig. 1 is a vertical, fragmentary, sectional view, partly in elevation, of one embodiment of the present invention.

In Fig. 1 a heat exchanger is generally indicated at 1 and it includes a head member or barrel wall 2 and a shell portion 3. The head member 2 and the shell portion 3 are separated by a tube sheet 4 in which tubes 5 are seated in the usual manner.

The head member or barrel wall 2 includes a fluid inlet 6 and a fluid outlet 7 which communicate with head chambers 8 and 9, respectively. The chambers 8 and 9 are separated by partitions 10 and 11 in a conventional manner as shown in Fig. 1.

The open end of the barrel wall 2 remote from the tube sheet 4 is closed by closure means that includes a closure diaphragm 12 and a cover 13. The diaphragm 12 is a thin-walled flexible flat member composed of metal or other suitable material and has a uniform thickness. The diaphragm 12 has a diameter substantially equal to the inner diameter of the barrel wall 2 and is secured in a fluid-tight manner, such as by a peripheral weld 14, to a peripheral flange portion 15 of the barrel wall, which flange portion is separated on one side from the barrel wall 2 by a trepan groove 16. The other side of the flange portion 15 provides a shoulder 17 against which the cover 13 is seated. The thickness of the wall 2 above the flange portion 15 is less than that below the flange portion as viewed in Fig. 2. Accordingly, the cover 13 provides reinforcement for the diaphragm 12 which, together with the weld 14, serves as the fluid-tight seal for the interior of the head member 2.

It is understood, however, that other sealing means, such as O-rings or gaskets, could be used instead of the diaphragm 12 and weld 14.

Figure 2:
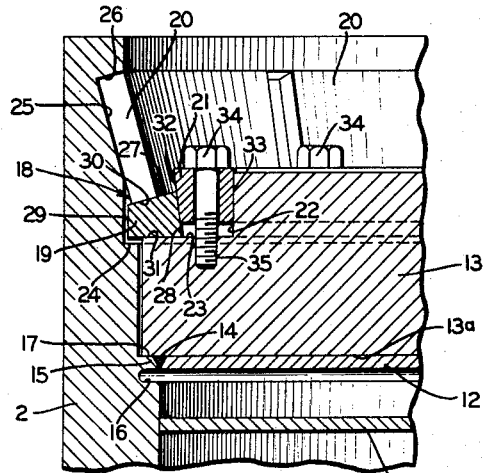
Fig. 2 is an enlarged sectional view of a portion of the heat exchanger shown in Fig. 1.
Figure 3:
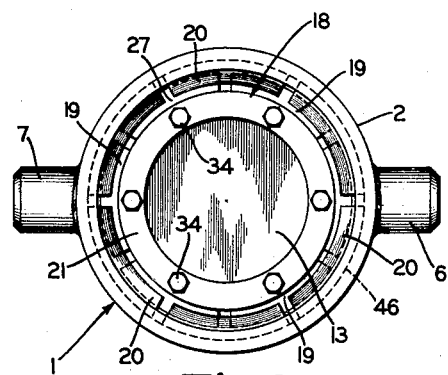
Fig. 3 is a plan view taken on the line 3—3 of Fig. 1.

The cover 13 is held in place against the diaphragm 12 and the shoulder 17 by blocking means generally indicated at 18, as shown in Fig. 2. The blocking means 18 includes a plurality of wedge blocks 19 disposed around the outer periphery of the cover 13 at equally spaced intervals (Fig. 3). In addition, the blocking means 18 for the embodiment shown in Fig. 2 includes a plurality of shear blocks 20 and an annular wedge member 21.

As shown in Figs. 1 and 2, the outer peripheral portion of the cover 13 is notched to provide a cylindrical shoulder surface 22 and an annular shoulder surface 23.

Moreover, the barrel wall 2 includes an annular shoulder 24 on the inner surface whose longitudinal distance from the shoulder 17 is equal to or less than the distance between the inner side of the cover 13 and the annular shoulder surface 23. The barrel wall 2 includes an annular recess having inclined surfaces or walls 25 and 26, which surfaces are inclined preferably at 90 degrees to each other and at acute angles to the inner surface of the barrel wall 2. The surface 26 is preferably parallel to the surface 27 of the block 19. Generally, the annular recess formed by the surfaces 25 and 26 is a receptacle for the plurality of shear blocks 20 which are substantially rectangular in shape. Specifically, the inclined surface 26 reinforces the wedge blocks 19 through the shear blocks 20.

The wedge blocks 19 are generally wedge-shaped members having inclined sides 27 and 28. The inclined side 27 extends upwardly and outwardly from the inner surface of the barrel wall 2 so that end surface 29 of the block is smaller than the inclined side 28. The inclined side 27 engages one end 30 of the shear block 20 remote from the surface 26 in the barrel wall 2.

The inclined side 28 of the wedge block 19 extends upwardly from the annular shoulder surface 23 and away from the cylindrical shoulder surface 22. Furthermore, the wedge block 19 includes a side 31, a portion of which is in abutment with the annular shoulder surface 23 opposite the abutting surfaces 27 and 30.

The wedge ring 21 includes an inclined side 32 for wedging engagement with the inclined sides 28 of the wedge blocks 19. The side 33 of the wedge ring 21 opposite the inclined side 32 is preferably parallel to the longitudinal axis of the heat exchanger extending vertically therethrough. The side 33 abuts the cylindrical shoulder surface 22 of the cover 13. A plurality of tightening bolts 34 extend through the wedge ring 21 and have inner ends secured in threaded bolt apertures 35 in the annular shoulder surface 23.

Accordingly, when the bolts 34 are tightened into place, the wedge ring 21 is drawn closer to the annular shoulder surface 23 so that greater portions of the abutting sides 28 and 32 are in contact with each other, thereby driving the spaced wedge blocks radially outwardly toward the barrel wall 2. This action causes the abutting sides 27 and 30 of the wedge blocks 19 and shear blocks 20, respectively, to slide with respect to each other, whereby the thicker portion of the wedge blocks 19 nearer the inclined side 28 is moved directly between the annular shoulder surface 23 of the cover 13 and the shear blocks 20. By tightening the bolts 34, the inner surface 13a of the cover 13 is brought onto reinforcing abutment with the diaphragm 12 and the shoulder 17 of the flange 15.

Figure 4:
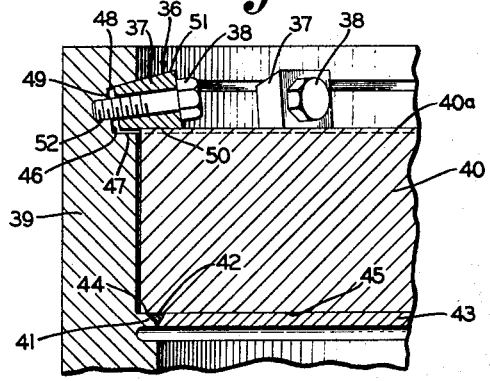
Fig. 4 is a vertical sectional view showing a second embodiment of the invention.
Figure 5:
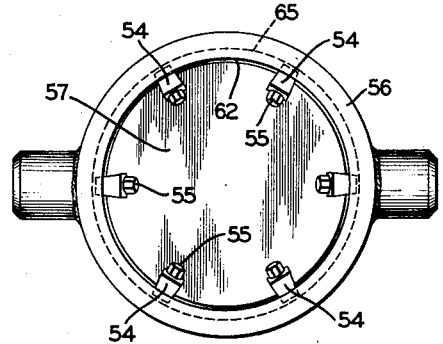
Fig. 5 is a plan view similar to that of Fig. 3, showing the second embodiment of Fig. 4.

The second embodiment of the invention includes blocking means generally indicated at 36 (Fig. 4) including wedge blocks 37 and tightening bolts 38 which are adapted for connection with a barrel wall 39 and a cover 40 therefor (Fig. 3). Like the heat exchanger construction shown in Figs. 1 and 2, the barrel wall 39 includes a flange portion 41 that is connected in a fluid-tight manner, such as by an annular weld 42, to a sealing diaphragm 43 similar to the diaphragm 12. Likewise, the flange portion 41 provides a shoulder 44 against which abuts the outer peripheral portion of the inner surface 45 of the cover 40. Moreover, an annular groove or recess 46 is provided in the inner surface of the barrel wall 39, which recess is spaced inwardly from the open end of the barrel wall. The recess 46 includes opposite surfaces or walls 47 and 48 and an end wall 49. The wall 48 is inclined upwardly and outwardly from the end wall 49 at an acute angle to the inner surface of the barrel wall 39.

The wall 47 of the recess 46 is spaced longitudinally above (as viewed in Fig. 4) the shoulder 44 by a distance substantially less than the thickness of the cover 40, whereby the wedge blocks 37 may be drawn into the recess 46 by the bolts 38 without impingement of the underside 50 of the wedge blocks 37 with the wall 47.

The undersides 50 engage the outer portion of the cover 40 and the opposite sides 51 of the wedge blocks 37 are inclined in a manner similar to the inclination of the wall 48 of the recess 46.

As the bolts 38 which extend through the wedge blocks and are seated in threaded apertures 52 are tightened into place, the sides 50 and 51 engaging the wall 48 and the outer side 40a of the cover 40 force the inner surface 45 of the cover 40 into engagement with the diaphragm 43 and the shoulder 44.

Figure 6:
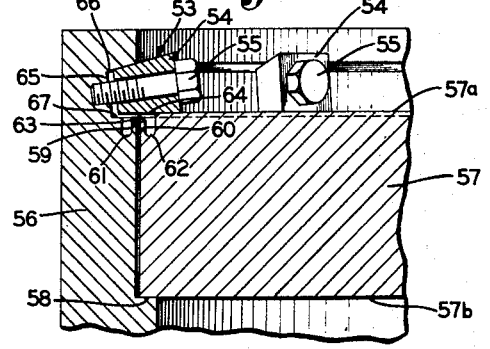
Fig. 6 is an enlarged vertical sectional view showing a third embodiment of the invention.

The third embodiment of the invention includes blocking means generally indicated at 53 (Fig. 6) and includes wedge block 54 and tightening bolt 55. The blocks 54 and the bolts 55 are similar to the blocks 37 and bolt 38, respectively. The wedge block 54 and bolt 55 are adapted for use with a barrel wall 56 and a cover 57 which is seated on a shoulder 58 on the inside surface of the barrel wall 56. Unlike the construction shown in Fig. 4, the barrel wall 56 and cover 57 are provided with adjacent welding flange portions 59 and 60, respectively. The flange portions 59 and 60 are annular and are separated from the main body portions of the barrel wall and cover by trepan grooves 61 and 62, respectively.

A fluid seal between opposite sides 57a and 57b of the cover 57 is provided by an annular weld 63 extending between the outer adjacent ends of the flange portions 59 and 60. The weld 63 is located sufficiently below the outer surface 57a of the cover in order to provide operating clearance with respect to an underside 64 of the wedge block 54. In this manner the wedge block may be seated deeper into a groove or recess 65 similar to the grooves 48, if necessary, by tightening the bolt 55 without interfering with the movement of the wedge blocks 54. The groove or recess 65 includes opposite surfaces or walls 66 and 67 and when the blocks 54 are seated therein the blocks engage the surface 66 of the groove and the surface 57a of the cover 57.

The head closure construction for heat exchangers of the present invention is an improvement over previous constructions in that the interfitting surfaces between the cover and barrel wall may be prepared with manufacturing tolerances of less accuracy than is ordinarily required. By providing wedge-shaped blocks which cooperate with tightening means, the inclined surfaces of the blocks may be engaged between the cover and barrel wall of a heat exchanger, the barrel wall being provided with corresponding inclined surfaces which directly or indirectly reinforce the wedge blocks on the cover.

The embodiments of the invention set forth a wedge-shaped block having outwardly inclined sides providing a truncated pyramid type of construction, the smaller end of which is easily inserted in position and thereafter may be forced into a tight blocking position. In this manner the hydrostatic load created within the heat exchanger is taken up by the wedge blocks as well as the initial local deformation under pressure. Finally, the wedge block construction is applicable not only to the cover but also the tube sheet for a heat exchanger, as well as adapted for use with sealing means other than welded joints, such as O-rings or the like. Moreover, though six bolts 34, 38 and 55 are shown in each of the embodiments, there may be as many bolts as are required to give the necessary shear area for taking up the load when the heat exchanger is in operation.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction shown.

Having now described the features, constructions and principles of the invention, the characteristics of the new heat exchanger head closure construction, and the advantageous, new and useful results provided; the new and useful discoveries, principles, parts, elements, combinations, subcombinations, structures and arrangements, and mechanical equivalents obvious to those skilled in the art are set forth in the appended claims.

We claim:

1. In a heat exchanger of the type wherein a barrel wall forms a head chamber terminating in an open end and the inner surface of the barrel wall has an outwardly facing shoulder, and wherein a cover member for the open end is provided with inside and outside surfaces with the inside surface abutting the shoulder, and wherein means for sealing the head chamber is associated with the cover member; the combination of blocking means for holding the cover member against the shoulder and including a plurality of wedge blocks, engaging surface means for the wedge blocks on the inner surface of the barrel wall between the cover member and the open end, the inner surface of the barrel wall having spaced bolt-receiving apertures between the cover member and the open end, each wedge block being disposed between the cover member and the engaging surface means, each wedge block having one side abutting the outside surface of the cover and an opposite side inclined at an acute angle to said one side, each wedge block having a bore therethrough alignable with one of the bolt-receiving apertures, and means including a bolt in the bore of each wedge block engageable with a bolt-receiving aperture for forcing the blocking means in wedge-seating engagement between the engaging surface means and cover.

2. In a heat exchanger of the type wherein a barrel wall forms a head chamber terminating in an open end and the inner surface of the barrel wall has an outwardly facing shoulder, and wherein a cover member for the open end is provided with inside and outside surfaces with the inside surface abutting the shoulder, and wherein means for sealing the head chamber is associated with the cover member; the combination of blocking means for holding the cover member against the shoulder and including a plurality of wedge blocks, the inner surface of the barrel wall having spaced bolt-receiving apertures between the cover member and the open end, each wedge block having one side abutting the outside surface of the cover member and having a longitudinal bore alignable with one of the bolt-receiving apertures, the barrel wall having recess means in the inner surface for receiving the blocking means, the wedge block having another side opposite and inclined at an acute angle to said one side, and means including a bolt in the bore of each wedge block for forcing the wedge blocks radially outwardly and establishing wedge blocking reaction forces between the recess means and the cover member.

3. In a heat exchanger of the type wherein a barrel wall forms a head chamber terminating in an open end and the inner surface of the barrel wall has an outwardly facing shoulder, and wherein a cover member for the open end is provided with inside and outside surfaces with the inside surface abutting the shoulder, and wherein means for sealing the head chamber is associated with the cover member; the combination of blocking means for holding the cover member against the shoulder and including a plurality of wedge blocks, the inner surface of the barrel wall having bolt-receiving apertures between the cover member and the engaging surface means, each wedge block having a pair of opposite sides inclined at an acute angle to each other and having a longitudinal bore therethrough alignable with one of the bolt-receiving apertures, engaging surface means for the blocking means on the inner surface of the barrel wall between the cover member and the open end, one of said inclined sides on each wedge block abutting the outside surface of the cover member, and means including a bolt in the bore of each wedge block for moving the wedge block from non-wedging to wedging position between the cover member and the engaging surface means.

4. In a heat exchanger of the type wherein a barrel wall forms a head chamber terminating in an open end and the inner surface of the barrel wall has an outwardly facing shoulder, and wherein a cover member for the open end is provided with inside and outside surfaces with the inside surface abutting the shoulder, and wherein means for sealing the head chamber is associated with the cover member; the combination of blocking means for holding the cover member against the shoulder and including a plurality of spaced wedge blocks, recess means in the inner surface of the barrel wall having an engaging surface for the blocking means, the inner surface of the barrel wall having spaced bolt-receiving apertures between the cover member and the engaging surface, each wedge block having a pair of opposite sides inclined at an acute angle to each other and having a longitudinally extending bore alignable with one of the bolt-receiving apertures, one of said inclined sides on each wedge block abutting the outside surface of the cover member, the engaging surface being inclined parallel to and facing the other inclined side of the wedge block, and bolt means in the aligned bore and aperture of each wedge block for moving the wedge blocks radially outward and establishing wedge blocking reaction forces between the recess means and the cover member.

5. In a heat exchanger of the type wherein a barrel wall forms a head chamber terminating in an open end and the inner surface of the barrel wall has an outwardly facing shoulder, and wherein a cover member for the open end is provided with inside and outside surfaces with the inside surface abutting the shoulder, and wherein means for sealing the head chamber is associated with the cover member; the combination of blocking means for holding the cover member against the shoulder including a plurality of spaced wedge blocks, the inner surface of the barrel wall including an annular recess between the cover member and the open end and including a plurality of spaced bolt-receiving apertures in the annular recess and extending substantially radially thereof, each wedge block being wedge-shaped and having a smaller end seated within the recess and having a larger end in abutment with the cover member, the abutting sides of the recess and wedge blocks being inclined upwardly and inwardly toward the longitudinal axis passing through the center of the cover member, and means including a bolt and bolt-receiving means in each wedge block alignable with one of the apertures for moving each wedge block radially outward into wedging position between the cover and the recess.

References Cited in the file of this patent

UNITED STATES PATENTS

| | | |
|---|---|---|
| 539,925 | Swan | May 28, 1895 |
| 2,029,606 | Bredtschneider | Feb. 4, 1936 |
| 2,252,488 | Bierend | Aug. 12, 1941 |
| 2,616,587 | Petch | Nov. 4, 1952 |
| 2,711,266 | Kopp | June 21, 1955 |
| 2,766,903 | Boni | Oct. 16, 1956 |
| 2,821,325 | Chapellier et al. | Jan. 28, 1958 |

FOREIGN PATENTS

| | | |
|---|---|---|
| 903,569 | France | Jan. 22, 1945 |